(12) United States Patent
Taylor et al.

(10) Patent No.: US 9,950,397 B2
(45) Date of Patent: *Apr. 24, 2018

(54) BADGE FOR GOLF CLUB HEAD

(71) Applicants: Sheryl Folck, San Diego, CA (US); Taylor Made Golf Company, Inc., Carlsbad, CA (US)

(72) Inventors: Scott Taylor, Bonita, CA (US); Scott Edward Folck, San Diego, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,989

(22) Filed: Dec. 4, 2014

(65) Prior Publication Data

US 2015/0087441 A1    Mar. 26, 2015

Related U.S. Application Data

(63) Continuation of application No. 13/717,518, filed on Dec. 17, 2012, now Pat. No. 8,920,261.

(51) Int. Cl.
| | |
|---|---|
| *A63B 53/04* | (2015.01) |
| *B23P 11/02* | (2006.01) |
| *A63B 60/54* | (2015.01) |
| *A63B 43/00* | (2006.01) |
| *A63B 71/06* | (2006.01) |

(52) U.S. Cl.
CPC ............ *B23P 11/02* (2013.01); *A63B 53/047* (2013.01); *A63B 60/54* (2015.10); *A63B 43/005* (2013.01); *A63B 2071/0694* (2013.01); *A63B 2209/00* (2013.01); *Y10T 29/49945* (2015.01)

(58) Field of Classification Search
CPC ...................................................... A63B 60/54
See application file for complete search history.

(56) References Cited

U.S. PATENT DOCUMENTS

| | | |
|---|---|---|
| 7,789,771 B2 | 9/2010 | Park et al. |
| 7,819,757 B2 | 10/2010 | Soracco et al. |
| 7,892,106 B2 | 2/2011 | Matsunaga et al. |

(Continued)

OTHER PUBLICATIONS

Notice of Allowance from the United States Patent & Trademark Office in co-pending U.S. Appl. No. 13/717,518, dated Aug. 26, 2014.

*Primary Examiner* — Michael Dennis
(74) *Attorney, Agent, or Firm* — Klarquist Sparkman, LLP

(57) ABSTRACT

The present disclosure concerns embodiments of a badge or insert for a golf club head that can eliminate undesired gaps between the insert and the peripheral sidewall of the cavity that receives the insert. In one embodiment, a golf club head comprises a main body comprising a cavity, which defines a central surface and an inner peripheral surface at least partially surrounding the central surface. An insert comprises a central portion and a deflectable portion coupled to and extending along a peripheral edge section of the central portion. The deflectable portion has a shape corresponding to and contacting a corresponding section of the inner peripheral surface of the cavity. The deflectable portion forms a press-fit engagement with the corresponding section of the inner peripheral surface of the cavity that retains the deflectable portion in a deflected state relative to the central portion.

22 Claims, 4 Drawing Sheets

(56) References Cited

U.S. PATENT DOCUMENTS

| | | |
|---|---|---|
| 8,480,515 B2 | 7/2013 | Roach et al. |
| 2002/0098910 A1* | 7/2002 | Gilbert .................. A63B 53/04 473/332 |
| 2008/0032813 A1* | 2/2008 | Hagood ............... A63B 53/047 473/329 |
| 2010/0273570 A1* | 10/2010 | Ines .................... A63B 53/047 473/342 |

* cited by examiner

BADGE FOR GOLF CLUB HEAD

CROSS-REFERENCE TO RELATED APPLICATION

The present application is a continuation of U.S. patent application Ser. No. 13/717,518, filed Dec. 17, 2012, which is incorporated herein by reference.

FIELD

The present disclosure concerns embodiments of a golf club head, and in particular, embodiments of an improved badge insert for a golf club head.

BACKGROUND

Iron-type golf club heads typically include large cavities in their rear surfaces. Typically, the position and overall size and shape of a cavity are selected to remove mass from that portion of the club head and/or to adjust the center of gravity of the club head. Manufacturers of golf clubs often place a badge or insert in the cavity for decorative purposes and/or for indicating the manufacturer name, logo, trademark, or the like. In addition, a badge or insert may be used to achieve a performance benefit, such as for vibration damping.

Due to variances in investment casting, the size of the cavity for any particular model can vary between different vendors that perform the casting process and between club heads supplied from the same vendor. As a result, badges are often designed to be undersized relative to the nominal size of the cavity so as not to interfere with the peripheral sidewall of the cavity and sometimes are installed offset toward one side of the cavity. Unfortunately, this leaves unsightly gaps around the periphery of the badge.

SUMMARY

The present disclosure concerns embodiments of a badge or insert that can eliminate undesired gaps between the insert and the peripheral sidewall of the cavity which can otherwise occur due to variances in the exact size of the cavity. The insert typically is installed in the rear surface of an iron-type golf club head. Accordingly, the detailed description that follows describes embodiments of an insert installed in the rear surface of an iron-type club head. However, the insert also can be installed in a cavity formed in another portion of the club head (such as the front, heel, toe, upper, and/or lower portions of the club head) or in another type of club head (such as a driver or wood-type club head, a putter or wedge).

In one representative embodiment, a golf club head comprises a body comprising a face portion defining a striking face of the club head and a rear portion opposite the face portion. The rear portion includes a cavity, which defines a rear inner surface substantially opposite the striking face and an inner peripheral surface at least partially surrounding the rear inner surface. An insert is disposed in the cavity. The insert comprises a central portion and a peripheral edge portion coupled to the central portion. At least a portion of the peripheral edge portion comprises a deflectable portion having a shape corresponding to and contacting a corresponding section of the inner peripheral surface of the cavity, with the deflectable portion being retained in a deflected state by contact with the corresponding section of the inner peripheral surface of the cavity.

In another representative embodiment, a golf club head comprises a main body comprising a cavity, which defines a central surface and an inner peripheral surface at least partially surrounding the central surface. An insert is disposed in the cavity. The insert comprises a central portion and a deflectable portion coupled to and extending along a peripheral edge section of the central portion. The deflectable portion has a shape corresponding to and contacting a corresponding section of the inner peripheral surface of the cavity. The deflectable portion forms a press-fit engagement with the corresponding section of the inner peripheral surface of the cavity that retains the deflectable portion in a deflected state relative to the central portion.

In another representative embodiment, a method of assembling a golf club head comprises providing a golf club head comprising a face portion defining a striking face of the club head and a rear portion opposite the face portion, the rear portion including a cavity, the cavity defining a rear inner surface substantially opposite the striking face and an inner peripheral surface at least partially surrounding the rear inner surface. The method further comprises providing an insert comprising a central portion and a deflectable portion at least partially surrounding the central portion and corresponding to the shape of a corresponding section of the inner peripheral surface of the cavity, the deflectable portion being in a non-deflected state that is larger than the corresponding section of the inner peripheral surface. The insert is then inserted into the cavity such that the deflectable portion contacts the corresponding section of the inner peripheral surface of the cavity and moves to a deflected state relative to the central portion.

The foregoing and other objects, features, and advantages of the invention will become more apparent from the following detailed description, which proceeds with reference to the accompanying figures.

DETAILED DESCRIPTION

Figure 1:
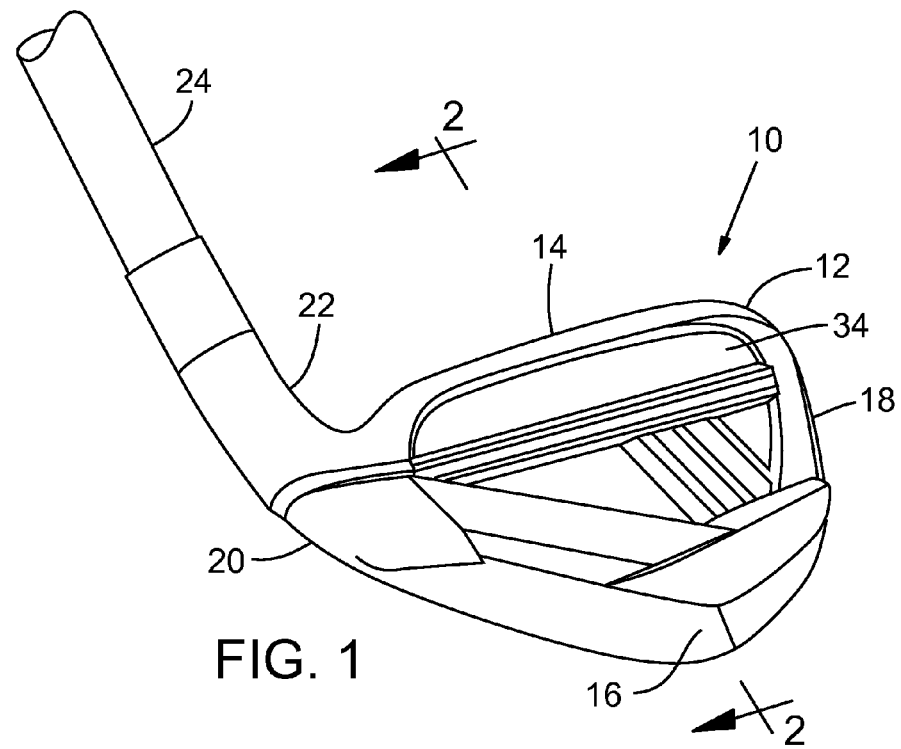
FIG. 1 is a perspective view of an exemplary embodiment of an iron-type golf club head having an insert installed in the rear portion of the club head.

Referring first to FIGS. 1-4, there is shown an iron-type golf club head 10, according to one embodiment. The club head 10 comprises a main body 12 having an upper portion 14, a lower portion 16, a toe portion 18, a heel portion 20, and a hosel 22 extending from the area where the heel portion 20 joins the upper portion 14. A shaft 24 can be joined to the hosel 22 to form an assembled golf club. The lower end portion of the shaft 24 extends into the hosel 22 and is secured in place relative to the main body 12 using conventional techniques or mechanisms.

Figure 3:
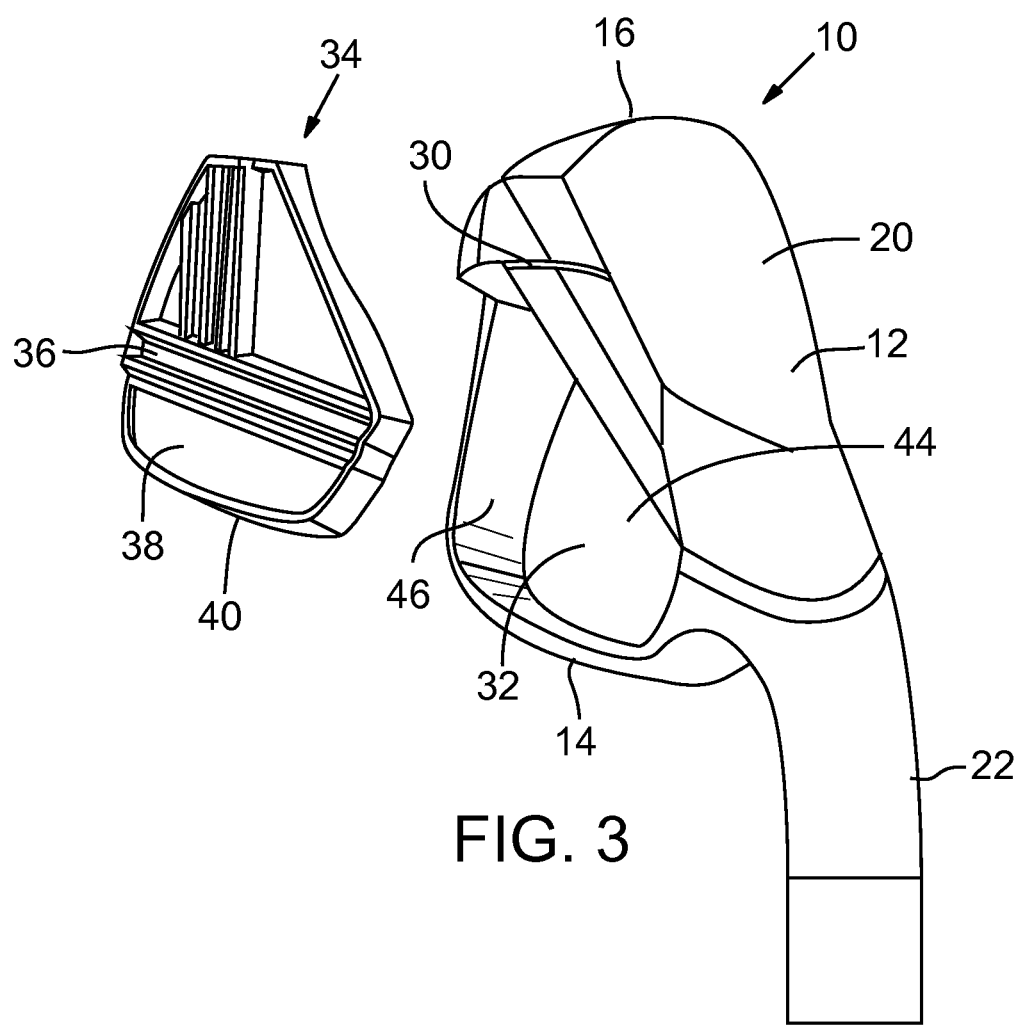
FIG. 3 is a perspective, exploded view of the club head and the insert of FIG. 1.
Figure 4:
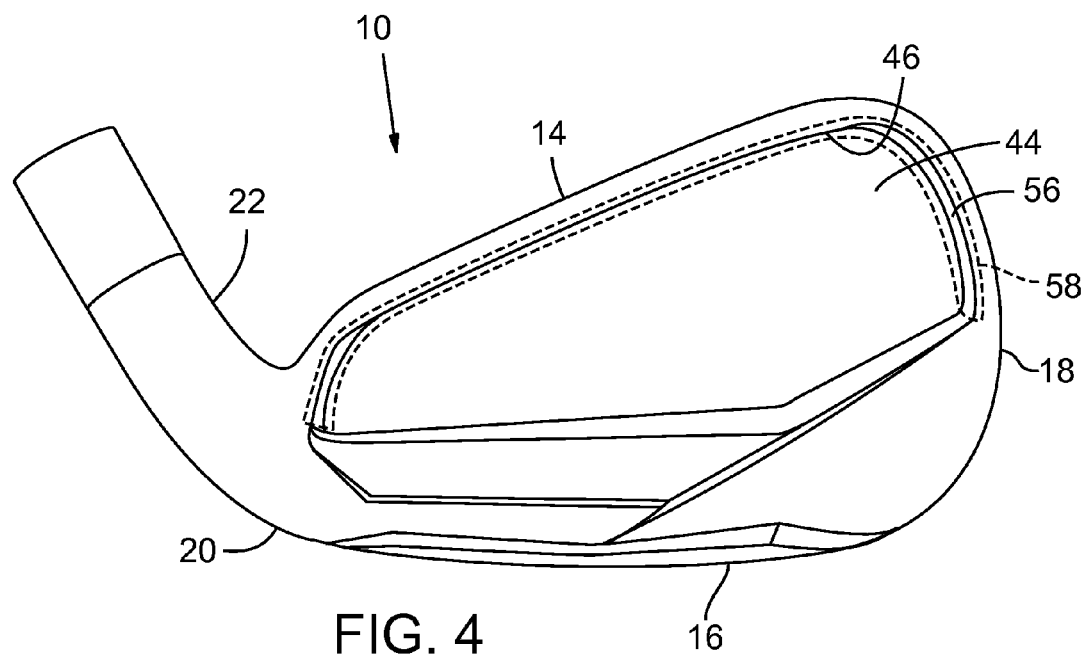
FIG. 4 is a rear elevation view of the club head of FIG. 1, shown with the insert removed for purposes of illustration.

The main body 12 also includes a face portion 26 defining a front striking face 28 for the club head and a rear portion 30 opposite the face portion 26. The rear portion 30 includes a recessed portion, or cavity, 32. As best shown in FIG. 3, the cavity 32 has a main inner surface 44 and an inner peripheral surface 46 surrounding the main inner surface. Disposed inside the cavity 32 is an insert 34 (also referred to as a "badge," "badge insert," or "medallion"). The insert 34 has an exposed outer surface 36 that is visible to a user. Words, logos, designs, graphics, trademarks, and other types of visible indicia may be printed or formed on the outer surface 36 for aesthetic or decorative purposes. In some embodiments, the insert 34 may also comprise materials or be constructed in a manner to provide a performance benefit, such as vibration damping.

Figure 2:
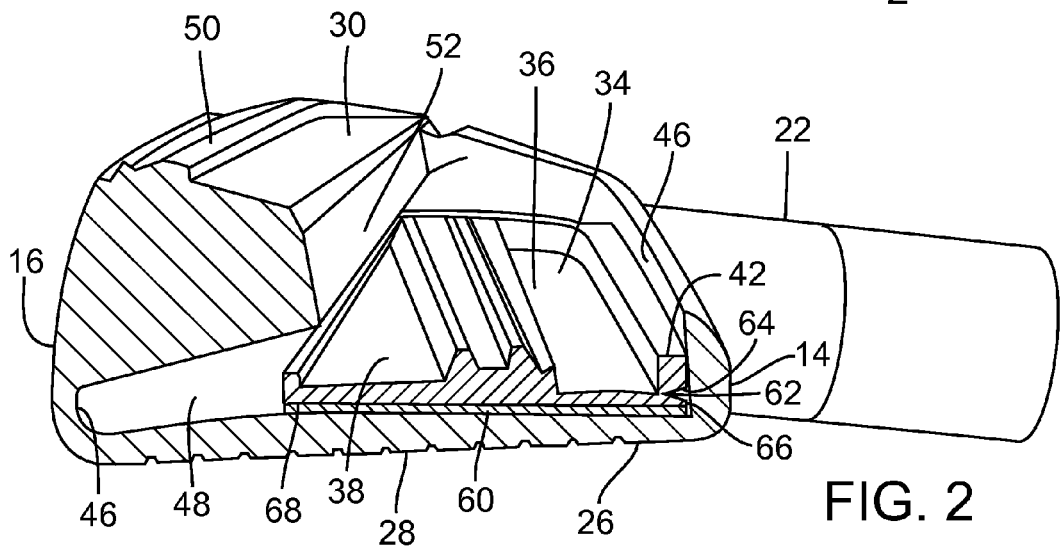
FIG. 2 is a cross-sectional view of the club head taken along line 2-2 of FIG. 1.

In the illustrated embodiment, as best shown in FIG. 2, a lower portion 48 of the cavity 32 is formed between the face portion 26 and a lower rear portion 50 of the club head. Thus, as can be seen, the insert 34 can be sized such that it extends slightly below an upper ledge 52 of the lower rear portion 50. As shown in FIG. 2, there can be a substantial gap between the inner peripheral surface 46 and the insert 34 within the lower cavity portion 48. The insert 34 need not be sized to cover this gap since it is hidden from view by the lower rear portion 50.

Figure 5:
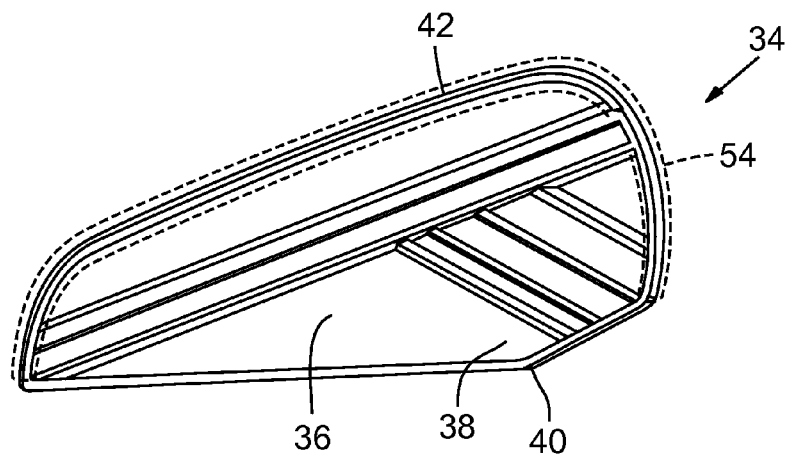
FIG. 5 is an elevation view of the insert of FIG. 1, shown apart from the club head.

Referring to FIG. 5, the insert 34 comprises a central portion 38 and an outer peripheral portion 40 coupled to and extending along the peripheral edge of the central portion 38. At least a portion of the peripheral portion 40 of the insert comprises a deflectable portion 42 that has a shape corresponding to and contacting a corresponding section 56 of the inner peripheral surface 46 of the cavity 32. In the illustrated embodiment, the deflectable portion 42 comprises the extent of the peripheral portion 40 encircled by dashed line 54 (FIG. 5) and the corresponding section 56 of the inner peripheral surface 46 comprises the extent of the peripheral surface 46 encircled by dashed line 58. As can be seen, the deflectable portion 42 extends along the peripheral upper edge and the peripheral heel and toe edges of the central portion but not along the peripheral lower edge of the central portion. Thus, in the illustrated embodiment, the lower part of the peripheral portion 40 that extends into the lower cavity portion 48 (and which is mostly hidden from view), need not be part of the deflectable portion because it is spaced from the peripheral inner surface 46 within the lower cavity portion 48 (FIG. 2).

The deflectable portion 42 is configured to be slightly oversized relative to the corresponding section 56 of the inner peripheral surface 46 but is deflectable relative to the central portion 38 to allow the deflectable portion 42 to conform to the corresponding section 56 as the insert is press-fitted into the cavity. In this manner, the deflectable portion 42 can contact the corresponding section 56 continuously along the entire extent of the deflectable portion 42 so that there are no visible gaps between the deflectable portion and the inner peripheral surface 46 of the cavity. Thus, if the exact size of the cavity for a particular model varies between club heads, such as due to investment casting variances or other manufacturing limitations, the insert 34 can be installed in the cavity without any visible gaps.

As shown in FIG. 2, an inner surface 68 of the insert can be adhesively secured to the inner surface 44 of the cavity, such as with a layer of double-sided tape 60, to ensure that insert remains in place within the cavity during normal use of the golf club. Alternatively, the insert 34 can be secured to the inner surface 44 of the cavity with epoxy or another suitable adhesive or glue.

As best shown in FIG. 2, the deflectable portion 42 in the illustrated configuration is coupled to the peripheral edge of the central portion 38 by a living hinge 62. The hinge 62 allows the deflectable portion 42 to conform to the inner peripheral surface 46 when the insert is pressed into the cavity 32. The hinge 62 can be formed by machining, injection molding, or otherwise forming a thinned region to reduce the cross-sectional thickness of the insert at or near the location at which the peripheral edge of the central portion 38 is coupled to the living hinge 62, such as a V-shaped gap 64 along the outer peripheral surface of the insert. In particular embodiments, the insert 34 can be a unitary piece of material that is molded, cast, machined or otherwise formed to have a central portion 38 and a raised peripheral portion 40 having a thickness greater than the central portion. The peripheral portion 40 (or at least the portion that will form the deflectable portion 42) is formed such that it is slightly larger than the opening defined by the corresponding section 56 of the inner peripheral surface. The gap 64 can then be formed in the outer peripheral surface of the insert to form the deflectable portion 42 and the hinge 62. The outer peripheral edge 66 of the central portion can be formed, or trimmed (if needed) so that it can fit within the cavity without contacting the inner peripheral surface. In the illustrated embodiment, the gap 64 is not formed in the portion of the insert 34 that extends into the lower cavity portion 48. Thus, the lower peripheral portion 40 of the insert that extends into the lower cavity portion 48 is simply defined by a raised portion of the insert. However, in other embodiments, the entire extent of the peripheral portion 40 can be a deflectable portion 42 (i.e., the hinge 62 can extend completely around the outer peripheral surface of the insert).

When the insert 34 is apart from the club head 10, the deflectable portion 42 is in a non-deflected state having a larger peripheral shape than the opening defined by the corresponding section 56 of the cavity. When the insert 34 is pressed into the cavity, the deflectable portion 42 contacts the corresponding section 56 of the inner peripheral surface 46 and is deflected inwardly slightly relative to the central portion 38 to assume a deflected state while the central portion 38 is not deformed or deflected by the installation process.

Any of various suitable materials can be used to form the central portion 38 and the peripheral portion 40. For example, in some embodiments, the central portion 38 may comprise a metal (e.g., aluminum, steel, nickel, cobalt, titanium, or alloys including these materials) and/or one or more of various polymers (e.g., ABS plastic (acrylonitrile—butadiene—styrene), nylon, and/or polycarbonate). In some embodiments, the peripheral portion 40 may comprise a metal (e.g., aluminum, nickel, cobalt, steel, titanium, or alloys including these materials), one or more of various polymers (e.g., ABS plastic, nylon, polycarbonate, or combinations of these materials), and/or an elastomer or a viscoelastic material, such as rubber or any of various synthetic elastomers, such as polyurethane, a thermoplastic or thermoset material polymer, or silicone or combinations of these materials.

In alternative embodiments, the entire cavity 32 may be visible, or it may be otherwise preferable to provide an insert 34 that is coextensive with the entire cavity 32. In such cases, the deflectable portion 42 can comprise the entire extent of the peripheral portion 40, such that the deflectable portion 42 contacts the entire inner peripheral surface 46, thereby eliminating any gaps between the insert and the inner peripheral surface 46 of the cavity.

Figure 6:
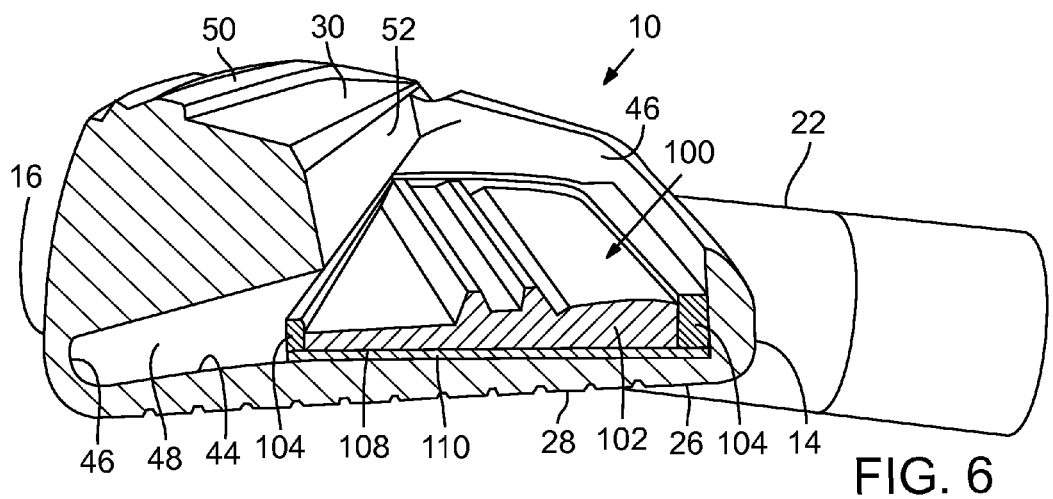
FIG. 6 is a cross-sectional view of a club head having another embodiment of an insert installed in the rear portion of the club head.
Figure 7:
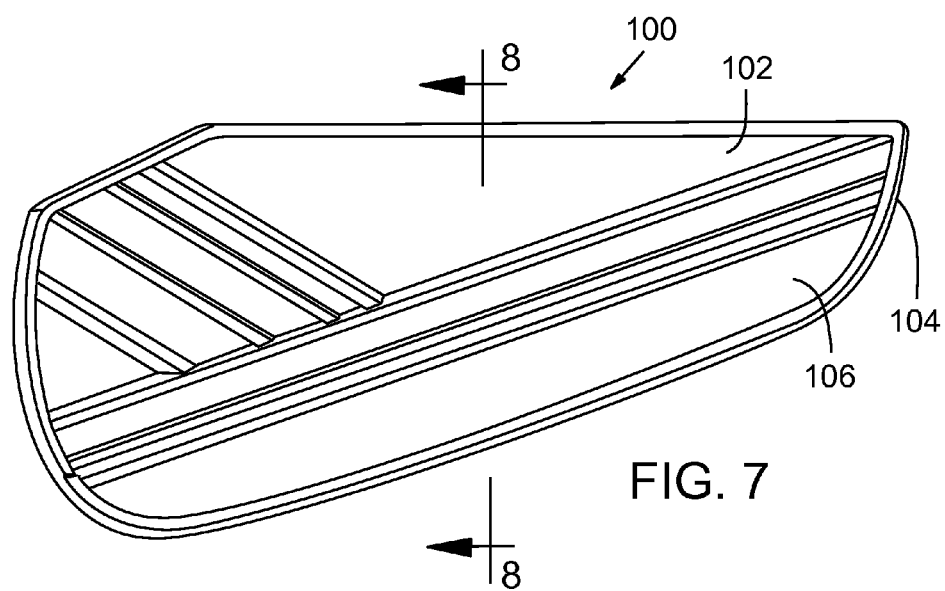
FIG. 7 is an elevation view of the insert of FIG. 6, shown apart from the club head.
Figure 8:
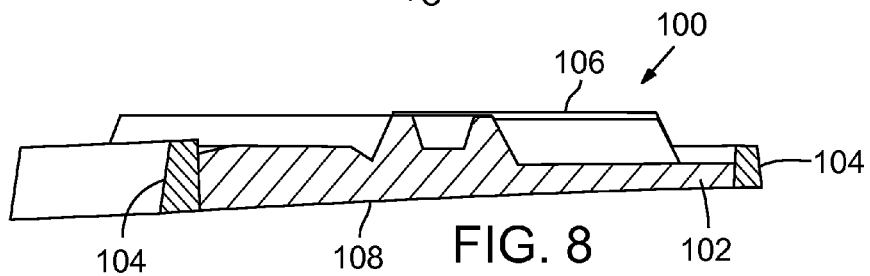
FIG. 8 is a cross-sectional view of the insert taken along line 8-8 of FIG. 7.

FIGS. 6-8 illustrate an insert 100, according to another embodiment, installed within the cavity 32 of the club head. The insert 100 comprises a central portion 102 and a deflectable peripheral portion 104 surrounding the outer peripheral edge of the central portion 102. The central portion 102 comprises an outer, exposed surface 106 on which there can be provided various indicia, logos, designs, and the like. The insert has an inner surface 108 that can be secured to the inner surface 44 of the cavity, such as with a piece of double-sided tape 110 or a suitable adhesive, such as epoxy.

The central portion 102 comprises a first material (or a first combination of multiple materials) and the peripheral portion 104 comprises a second material that is relatively more pliable and/or deformable than the first material. Like the insert 34 described above, the peripheral portion 104 of insert 100 corresponds to and contacts a corresponding section 56 of the inner peripheral surface 46 of the cavity. When the insert 100 is apart from club head 10, the peripheral portion 104 is in a non-deformed, non-deflected state that is slightly larger than the opening defined by the corresponding section 56 of the inner peripheral surface 46 of the cavity. When pressed into the cavity, the peripheral portion 104 can conform to the inner peripheral surface 46 and can contact the inner peripheral surface 46 continuously along the entire extent of the corresponding section 56 without any visible gaps between the peripheral portion 104 and the corresponding section 56. In other words, the peripheral portion 104 that comes in contact with the corresponding section 56 of the inner peripheral surface 46 moves to a deformed or deflected state in continuous contact with that portion of the inner peripheral surface 46 while the central portion 102 is not deflected or deformed by the installation process.

In particular embodiments, the peripheral portion 104 is formed from an elastomer or a viscoelastic material, such as rubber or any of various synthetic elastomers, such as polyurethane, a thermoplastic or thermoset material polymer, or silicone. The central portion 102 is formed from a material that is firmer than the peripheral portion 104. Desirably, the material for the central portion 102 is selected such that the central portion 102 does not deflect or deform when the insert 100 is inserted into the cavity 32. In particular embodiments, for example, the central portion can be formed from any suitable metal (such as aluminum, steel, nickel, cobalt, titanium, or alloys including these materials) or a polymer that is relatively harder than the material used to form the peripheral portion. For example, relatively harder polymers that can be used to form the central portion 102 include ABS plastic, nylon, and/or polycarbonate.

The peripheral portion 104 can be joined to the central portion 102 using any of various suitable techniques or mechanisms. For example, the peripheral portion 104 can be co-molded with and/or around the central portion 102. Alternatively, the peripheral portion 104 can be joined to the central portion 102 using an adhesive, welding, or by an interference fit between the two components.

In the illustrated embodiment, the entire peripheral portion 104 is deflectable, although this not need be the case. Since the lower part of the insert 100 extends into the lower cavity portion 48 and does not contact the adjacent portion of peripheral surface 46 (as shown in FIG. 6), this part of the insert need not include a deflectable peripheral portion. Of course, in embodiments where the entire cavity in the rear of the club head is visible, or where it may be otherwise preferable to provide an insert 100 that is coextensive with the entire cavity 32, it would be beneficial to provide a deflectable peripheral portion around the entire periphery of the insert.

The disclosed embodiments can be adapted for inserts that are installed in cavities and/or pockets located in other portions of a club head and for inserts that are installed in club heads other than irons, such as wood-type club heads (e.g., drivers), putters and wedges. In certain embodiments, for example, an insert having a deformable or deflectable peripheral portion as discussed above can be installed in a cavity located at any portion of any type of club head (e.g., a cavity formed in the upper portion, the lower portion, the toe portion, the heel portion, the rear portion, and/or the front portion of a club head). In one specific implementation, an insert having a deformable or deflectable peripheral portion in installed in the front face portion of a club head and forms the striking surface of the club head.

Furthermore, inserts as disclosed herein can also be adapted to be installed in products other than golf club heads, such as various types of sporting goods, household appliances, machinery, to name just a few. Thus, the embodiments of inserts disclosed herein can be installed in a cavity that is formed in just about any product or device.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We We therefore claim as our invention all that comes within the scope and spirit of these claims.

We claim:

1. A golf club head comprising:
   a body comprising a face portion defining a striking face of the golf club head and a rear portion opposite the face portion, the rear portion including a cavity formed in an external surface of the rear portion, the cavity defining a rear inner surface substantially opposite the striking face and an inner peripheral surface at least partially surrounding the rear inner surface; and
   an insert disposed in the cavity and visible during use of the golf club head, the insert comprising a central portion and a peripheral edge portion coupled to the central portion, the peripheral edge portion comprising a deflectable portion having a shape corresponding to and engaging a corresponding section of the inner peripheral surface of the cavity, the engagement of the deflectable portion with the corresponding section of the inner peripheral surface of the cavity causing the deflectable portion to deform to a deflected shape and retaining the deflected shape of the deflectable portion;
   wherein the deflectable portion is coupled to the central portion via a hinged connection located at the inner peripheral surface and the deflectable portion is bent relative to the central portion at the hinged connection, wherein the deflectable portion has a greater thickness than the central portion adjacent the hinged connection.

2. The golf club head of claim 1, wherein the central portion of the insert is not deformed.

3. The golf club head of claim 1, wherein the deflectable portion comprises less than the entire extent of the peripheral portion.

4. The golf club head of claim 1, wherein the deflectable portion extends around the entire periphery of the central portion.

5. The golf club head of claim 1, wherein the hinged connection comprises a living hinge formed between the deflectable peripheral portion and the central portion.

6. The golf club head of claim 1, wherein the deflectable portion comprises an elastomeric material that is elastically deformed into the deflected state by contact with the corresponding section of the inner peripheral surface of the cavity.

7. The golf club head of claim 1, wherein the central portion has an inner surface that is adhesively secured to the rear inner surface of the cavity.

8. The golf club head of claim 1, wherein the central portion comprises a peripheral upper edge, a peripheral lower edge, and peripheral heel and toe edges extending between respective ends of the peripheral upper and lower edges, the deflectable portion extending along the peripheral upper edge and at least partially along the peripheral heel and toe edges.

9. The golf club head of claim 1, wherein the external surface is an external surface of the club head in an assembled state.

10. The golf club head of claim 1, wherein the body is directly attached to a hosel.

11. A golf club head comprising:
    a body comprising a face portion defining a striking face of the golf club head and a rear portion opposite the face portion, the rear portion including a cavity formed in an external surface of the rear portion, the cavity defining a rear inner surface substantially opposite the striking face and an inner peripheral surface at least partially surrounding the rear inner surface; and
    an insert disposed in the cavity and visible during use of the golf club head, the insert comprising a central portion and a peripheral edge portion coupled to the central portion, the peripheral edge portion comprising a deflectable portion having a shape corresponding to and engaging a corresponding section of the inner peripheral surface of the cavity, the engagement of the deflectable portion with the corresponding section of the inner peripheral surface of the cavity causing the deflectable portion to deform to a deflected shape and retaining the deflected shape of the deflectable portion;
    wherein the deflectable portion is coupled to the central portion via a hinged connection located at the inner peripheral surface and the deflectable portion is bent relative to the central portion at the hinged connection;
    wherein the hinged connection formed by a notch in the insert facing the inner peripheral surface.

12. A golf club head comprising:
    a body comprising a face portion defining a striking face of the golf club head and a rear portion opposite the face portion, the rear portion including a cavity formed in an external surface of the rear portion, the cavity defining a rear inner surface substantially opposite the striking face and an inner peripheral surface at least partially surrounding the rear inner surface; and
    an insert disposed in the cavity and visible during use of the golf club head, the insert comprising a central portion and a peripheral edge portion coupled to the central portion, the peripheral edge portion comprising a deflectable portion having a shape corresponding to and engaging a corresponding section of the inner peripheral surface of the cavity, the engagement of the deflectable portion with the corresponding section of the inner peripheral surface of the cavity causing the deflectable portion to deform to a deflected shape and retaining the deflected shape of the deflectable portion;
    wherein the deflectable portion comprises an elastomeric material that is elastically deformed into the deflected state by contact with the corresponding section of the inner peripheral surface of the cavity
    wherein the central portion is comprised entirely of a first material and the deflectable portion is comprised entirely of a second material, the first material being relatively harder than the second material.

13. A golf club head comprising:
    a main body comprising a cavity in an external surface thereof, the cavity defining a central surface and an inner peripheral surface at least partially surrounding the central surface; and
    an insert disposed in the cavity and visible during use of the golf club head, the insert comprising a central portion and a deflectable portion coupled to and extending along a peripheral edge section of the central portion, the deflectable portion having a shape corresponding to and contacting a corresponding section of the inner peripheral surface of the cavity, the deflectable portion engaging with the corresponding section of the inner peripheral surface of the cavity, the engagement of the deflectable portion with the corresponding section of the inner peripheral surface of the cavity causing the deflectable portion to bend relative to the central portion to a deflected shape along an axis adjacent the inner peripheral surface and retaining the deflected shape of the deflectable portion, wherein the axis is parallel to a striking face of the main body.

14. The golf club head of claim 13, wherein the body comprises a face portion defining the striking face of the club head and a rear portion opposite the face portion, wherein the cavity is formed in a rear surface of the rear portion of the main body and the central surface of the cavity is substantially opposite the striking face.

15. The golf club head of claim 14, wherein the club head comprises an iron-type club head.

16. A golf club head comprising:
a main body comprising a cavity in an external surface thereof, the cavity defining a central surface and an inner peripheral surface at least partially surrounding the central surface; and
an insert disposed in the cavity and visible during use of the golf club head, the insert comprising a central portion and a deflectable portion coupled to and extending along a peripheral edge section of the central portion, the deflectable portion having a shape corresponding to and contacting a corresponding section of the inner peripheral surface of the cavity, the deflectable portion engaging with the corresponding section of the inner peripheral surface of the cavity, the engagement of the deflectable portion with the corresponding section of the inner peripheral surface of the cavity causing the deflectable portion to bend relative to the central portion to a deflected shape along an axis adjacent the inner peripheral surface and retaining the deflected shape of the deflectable portion;
wherein the deflectable portion is coupled to the central portion by a living hinge formed by a notch in the deflectable portion facing the inner peripheral surface.

17. A golf club head comprising:
a main body comprising a cavity in an external surface thereof, the cavity defining a central surface and an inner peripheral surface at least partially surrounding the central surface; and
an insert disposed in the cavity and visible during use of the golf club head, the insert comprising a central portion and a deflectable portion coupled to and extending along a peripheral edge section of the central portion, the deflectable portion having a shape corresponding to and contacting a corresponding section of the inner peripheral surface of the cavity, the deflectable portion engaging with the corresponding section of the inner peripheral surface of the cavity, the engagement of the deflectable portion with the corresponding section of the inner peripheral surface of the cavity causing the deflectable portion to deform to a deflected shape and retaining the deflected shape of the deflectable portion
wherein the deflectable portion is comprised entirely of an elastomeric material and the central portion is comprised entirely of a material that is relatively less elastic than the elastomeric material of the deflectable portion.

18. A method of assembling a golf club head comprising:
providing a golf club head comprising a face portion defining a striking face of the club head and a rear portion opposite the face portion, the rear portion including a cavity formed in an external surface of the rear portion, the cavity defining a rear inner surface substantially opposite the striking face and an inner peripheral surface at least partially surrounding the rear inner surface;
providing an insert comprising a central portion and a deflectable portion at least partially surrounding the central portion and corresponding to the shape of a corresponding section of the inner peripheral surface of the cavity, the deflectable portion being in a non-deflected state that is larger than the corresponding section of the inner peripheral surface; and
inserting the insert into the cavity such that the deflectable portion contacts the corresponding section of the inner peripheral surface of the cavity and moves to a deflected state relative to the central portion, wherein the insert is positioned in the cavity such that it is visible during use of the golf club;
wherein engagement of the deflectable portion with the corresponding section of the inner peripheral surface of the cavity causes the deflectable portion to deform to a deflected shape and retains the deflected shape of the deflectable portion;
wherein the deflectable portion is coupled to the central portion via a hinged connection, which is located at the corresponding section of the inner peripheral surface after the insert is inserted into the cavity, and wherein the engagement of the deflectable portion with the corresponding section of the inner peripheral surface causes the deflectable portion to bend relative to the central portion at the hinged connection, wherein the deflectable portion has a greater thickness than the central portion adjacent the hinged connection.

19. The method of claim 18, wherein inserting the insert into the cavity comprises pressing the insert into cavity such that the deflectable portion is urged against the corresponding section of the inner peripheral surface of the cavity and moves to the deflected state relative to the central portion.

20. The method of claim 19, wherein after being inserted into the cavity, the deflectable portion contacts the corresponding section of the inner peripheral surface of the cavity continuously along the entire length of the deflectable portion.

21. The method of claim 19, wherein inserting the insert into the cavity further comprises adhesively securing an inner surface of the central portion to the rear inner surface of the cavity.

22. The method of claim 19, wherein inserting the insert into the cavity does not deform the central portion.

* * * * *